A. B. COLE.
FRICTION DRIVE MECHANISM FOR AUTOMOBILES.
APPLICATION FILED NOV. 23, 1908.

928,739.

Patented July 20, 1909.

Witnesses
A. J. McCauley
Nells L. Church

Inventor:
Albert B. Cole
by Bakewell & Cornwall Attys.

UNITED STATES PATENT OFFICE.

ALBERT B. COLE, OF ST. LOUIS, MISSOURI.

FRICTION DRIVE MECHANISM FOR AUTOMOBILES.

No. 928,739.      Specification of Letters Patent.      Patented July 20, 1909.

Application filed November 23, 1908. Serial No. 464,101.

*To all whom it may concern:*

Be it known that I, ALBERT B. COLE, a citizen of the United States, residing at St. Louis, Missouri, have invented a certain new and useful Improvement in Friction Drive Mechanisms for Automobiles, of which the following is a full, clear, and exact description, such as will enable others skilled in the art to which it appertains to make and use the same, reference being had to the accompanying drawings, forming part of this specification, in which—

Figure 1:
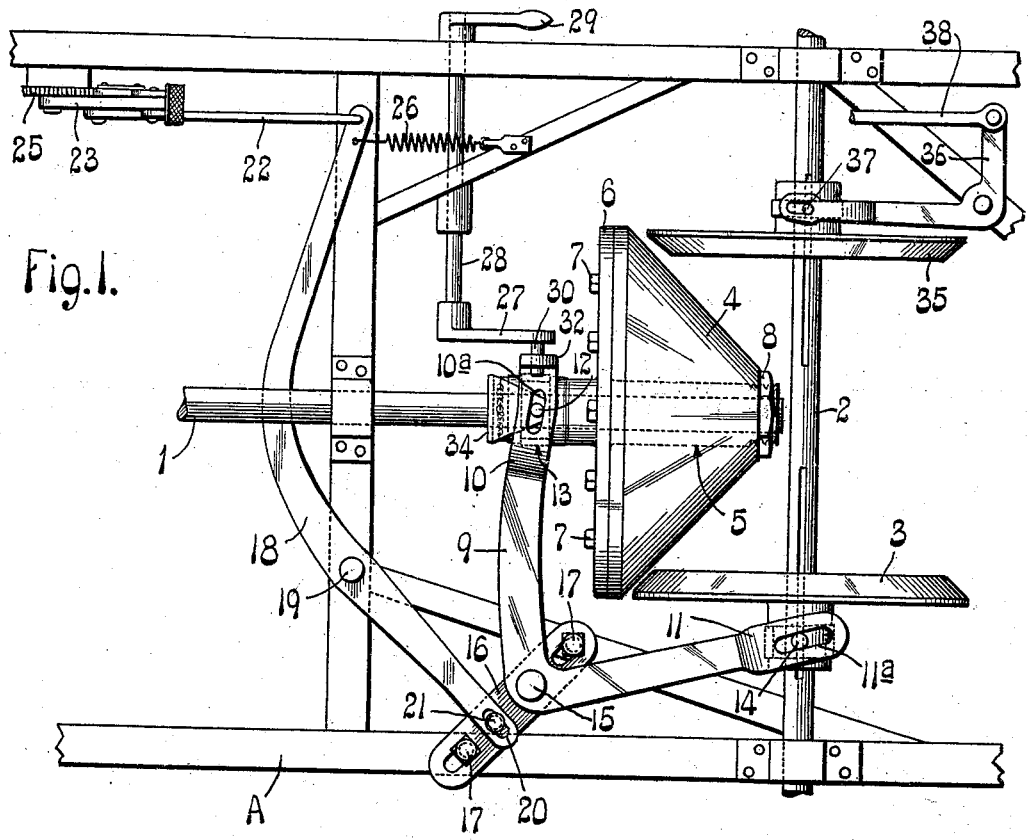
Figure 2:
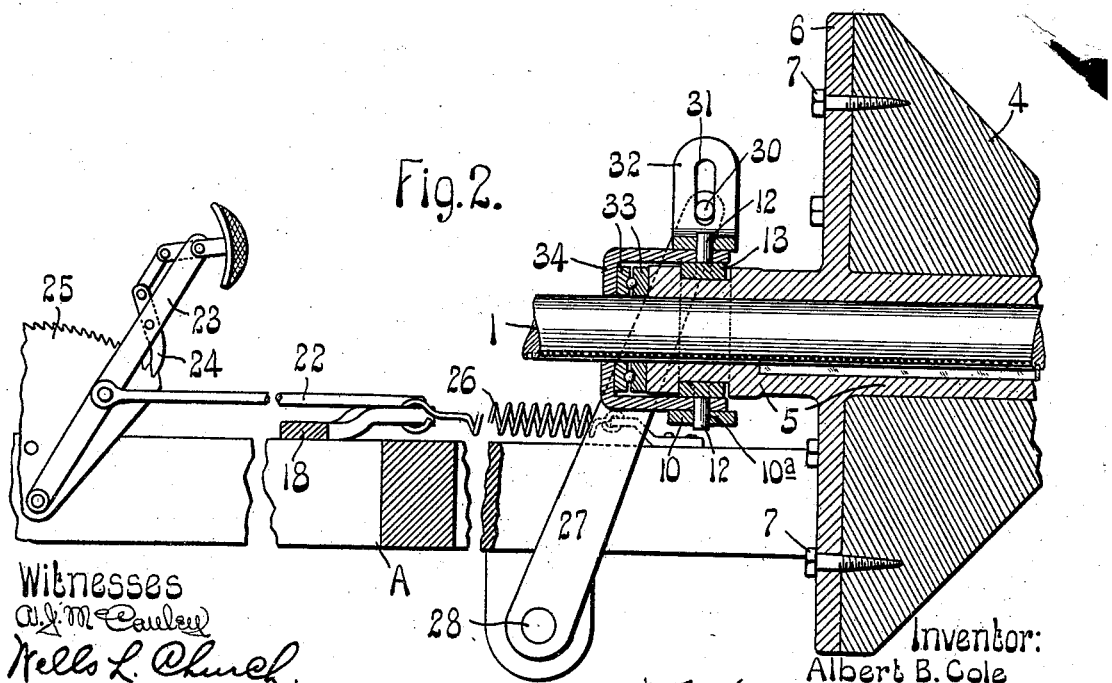

Figure 1 is a top plan view of a friction drive mechanism constructed in accordance with my invention; and Fig. 2 is an enlarged vertical sectional view of part of the mechanism shown in Fig. 1.

This invention relates to driving mechanisms for automobiles, and particularly to friction driving mechanisms.

The main object of my invention is to provide a friction driving mechanism of simple construction that will not wear out quickly and which is more efficient than the friction driving mechanisms heretofore used on automobiles.

Another object is to provide a friction driving mechanism which is so constructed that the member which has a fiber surface or comparatively soft surface will not flatten or wear away in spots. And still another object is to provide a friction drive mechanism for automobiles which is so constructed that the drive shaft is not subjected to excessive strains and very little pressure is required to hold the driven member in engagement with the drive member.

Other objects and desirable features of my invention will be hereinafter pointed out.

Referring to the drawings which illustrate the preferred form of my invention, A designates a portion of the underframe of an automobile, and 1 designates a drive shaft that is journaled in bearings on said frame. A driven shaft 2, which is connected to the wheels of the automobile, is arranged at right angles to the drive shaft 1, and said driven shaft is provided with a beveled disk 3 that coöperates with an approximately conical-shaped friction member 4 on the drive shaft so as to transmit the movement of the drive shaft to the driven shaft. The friction member 4 on the drive shaft preferably consists of a conical-shaped piece of solid fiber or some other suitable material that surrounds a metallic hub 5 provided with a flange 6 to which the fiber is connected by means of lag screws 7 or other suitable fastening devices. The hub 5 is provided at its rear end with a screw-threaded portion that receives a nut 8 which clamps the block of fiber tightly against the flange 6 but it will, of course, be understood that the fiber could be connected to its hub in numerous other ways without departing from the spirit of my invention. The disk 3 is preferably formed of metal and is provided with a beveled edge that conforms to the taper of the coöperating drive member 4 so as to produce a true rolling contact between the drive member and the driven member and thus eliminate slipping of one member on the other.

The members 3 and 4 are splined or feathered to the shafts 2 and 1, respectively, on which they are mounted so that they can be moved longitudinally of same to vary the speed of the driven shaft and also move the members 3 and 4 into and out of engagement with each other. In the construction herein shown the means for moving the members 3 and 4 longitudinally of their shafts consists of a bell crank lever 9 provided at its opposite ends with jaws 10 and 11 that are connected to the drive member 4 and to the driven member 3, respectively. The jaw 10 is provided with elongated slots 10$^a$ that receive pins 12 on a collar 13 which is loosely mounted in a groove in the hub 5 of the drive member and the jaw 11 is provided with elongated slots 11$^a$ that receive pins 14 on a collar which is loosely mounted in a groove in the hub of the driven member 3.

The lever 9 is pivotally connected at 15 to a movable support 16 provided with elongated slots through which bolts 17 on the underframe project so as to guide said support and retain it in position, and said support is adapted to be shifted in opposite directions to move the members 3 and 4 into and out of engagement with each other. As shown in Fig. 1, the slots 10$^a$ and 11$^a$ in the jaws of the bell crank lever 9 lie at an angle to the shafts 1 and 2, respectively, so that when the support 16 is shifted inwardly the members 3 and 4 will be moved into engagement with each other, and when said support is shifted outwardly said members will be moved out of engagement with each other. Movement is imparted to the support 16 by means of a lever 18 pivotally connected at 19 to the underframe and provided at one end with an elongated slot 20 that receives a pin 21 on the support 16, the opposite end of said lever being connected by a link 22 to a manually-operated lever 23 arranged in such a position that it can be operated by the person driving the automobile. The lever 23 is provided with a pawl 24 that coöperates with a stationary rack 25 to hold it in the position into which it has been moved, and when said pawl is released the lever 23 will be restored to its normal position and thus disengage the members 3 and 4, by means of a spring 26 connected to the lever 18 and to the underframe.

From the foregoing it will be seen that the lever 18 is operated to move the members 3 and 4 into and out of engagement with each other, and when it is desired to change the speed of the driven shaft 2 the bell crank lever 9 is turned on its fulcrum so as to move the driven member 3 toward and away from the axis of the drive member 4.

The lever 9 is turned on its fulcrum by means of an arm 27 on a rock shaft 28 journaled in bearings on the frame A and provided with a handle 29 that is located in such a position that it can be grasped by the person driving the automobile. The arm 27 is provided at its upper end with a laterally projecting pin 30 that projects into a slot 31 formed in an ear or lug 32 on the arm of bell crank lever 9 which is connected to the hub of the friction drive member 4. When the shaft 28 is rocked in one direction the friction drive member 4 will be moved forwardly and the disk 3 will be moved toward the axis of the drive member 4 and thus reduce the speed of the driven shaft 2. When the shaft 28 is rocked in the opposite direction the friction drive member 4 will be moved rearwardly and the disk 3 will be moved outwardly away from the axis of the drive member and thus increase the speed of the driven shaft. I prefer to provide the hub 5 of the friction drive member 4 with a groove of greater width than the collar 13 which connects said hub to the bell crank lever 9 and also interpose a pair of ball bearing raceways 33 between the front end of the hub 5 and a yoke 34 that is connected to the pins 12 on collar 13 so that when the friction drive member 4 is shifted rearwardly to increase the speed of the driven shaft, the collar 13 will not be forced into frictional engagement with the rear edge of the slot in which it is arranged and thus retard the rotary movement of the drive member.

The shaft 2 is provided with a longitudinally movable beveled disk 35 that is adapted to be moved into engagement with the drive member 4 to reverse the driven shaft 2 and thus cause the automobile to move rearwardly, and the means herein shown for moving the reversing disk 35 into and out of engagement with the drive member 4 consists of a bell crank lever 36 connected to the underframe and provided in one of its arms with a slot that receives a pin 37 on a collar which is loosely mounted in a groove in the hub of the reversing disk, the other arm of the bell crank lever 36 being connected to an operating rod 38.

A friction driving mechanism of the construction above described is more efficient than the friction driving mechanisms that have heretofore been used on automobiles in view of the fact that the coöperating beveled surfaces on the drive member and the driven member insures a true rolling contact between said parts so that one will not slip on the other. Another desirable feature of my construction is that the fiber member, or the member that is provided with a comparatively soft surface, is connected to the drive shaft and consequently said member will not flatten or wear away in spots as would be apt to occur if it were connected to the driven shaft. In the friction driving mechanisms that have heretofore been used on automobiles the fiber member, or soft member, was connected to the driven shaft and the hard member, or metal member, to the drive shaft. Consequently, when the engine was started the metal member on the drive shaft would slip on the soft driven member and thus wear a flat spot on same. My improved construction overcomes this objectionable feature for the fiber member 4 is mounted on the drive shaft and the metal member 3 on the driven shaft. Another advantage of using a conical-shaped drive member and a beveled disk coöperating therewith is that when said members are thrown into engagement with each other, the drive shaft will not be subjected to an excessive lateral strain. Furthermore, a great degree of pressure is not required to hold the drive member and the driven member in engagement with each other when they are formed in this manner. By using a solid block of fiber or similar material for the drive member I am enabled to dress same down when it becomes worn and thus use the mechanism for a long period as there is sufficient material in the member 4 to enable the surface of same to be dressed down a number of times. The means for moving the members 3 and 4 is also of very simple construction and enables the person driving the automobile to accurately control the speed of same.

Having thus described my invention, what I claim as new and desire to secure by Letters Patent is:

1. A friction driving mechanism for vehicles, comprising a drive member, a driven member, means for shifting said members simultaneously to move them into and out of engagement with each other, and independent means for changing the position of said members to vary the speed of the driven member; substantially as described.

2. A friction driving mechanism for vehicles, comprising an approximately cone-shaped drive member formed of comparatively soft material, a coöperating disk-shaped member having a beveled edge, and means for shifting said drive member and driven member simultaneously to move them into and out of engagement with each other; substantially as described.

3. A friction driving mechanism for vehicles, comprising a drive shaft, a driven shaft arranged at approximately right angles thereto, coöperating friction members slidingly mounted on said shafts for transmitting the movement of the drive shaft to the driven shaft, an actuating member connected to said friction members, means for shifting said actuating member to simultaneously move the friction members into and out of engagement with each other, and independent means for moving said actuating member so as to change the position of the friction members and thus vary the speed of the driven shaft; substantially as described.

4. A friction driving mechanism for vehicles, comprising a drive shaft and a driven shaft arranged at right angles to each other, an approximately cone-shaped member slidingly mounted on the drive shaft, a coöperating disk-shaped member slidingly mounted on the driven shaft and provided with a beveled edge, a bell crank lever connected to the hubs of said members, and means for oscillating said bell crank lever to shift said members longitudinally of the shafts and thus vary the speed of the driven shaft; substantially as described.

5. A friction driving mechanism for vehicles, comprising a drive shaft and a driven shaft arranged at right angles to each other, an approximately cone-shaped member slidingly mounted on the drive shaft, a coöperating disk-shaped member slidingly mounted on the driven shaft and provided with a beveled edge, a bell crank lever connected to the hubs of said members, means for oscillating said bell crank lever to shift said members longitudinally of the shafts and thus vary the speed of the driven shaft, and independent means for bodily shifting said bell crank lever to move said members into and out of engagement with each other; substantially as described.

6. A friction driving mechanism for vehicles, comprising a drive shaft, a driven shaft arranged at right angles thereto, a cone-shaped member slidingly mounted on the drive shaft, a beveled disk slidingly mounted on the driven shaft, means for moving said members simultaneously to carry them into and out of engagement with each other, independent means for shifting said members longitudinally of their shafts to vary the speed of the driven shaft, and a beveled disk-shaped member mounted on the driven shaft and adapted to be moved into engagement with the cone-shaped member on the drive shaft to reverse the driven shaft; substantially as described.

7. A friction driving mechanism for vehicles, comprising a drive shaft, a driven shaft arranged at right angles thereto, coöperating friction members slidingly mounted on said shafts for transmitting the movement of the drive shaft to the driven shaft, a movable support, a bell crank lever pivotally connected to said support and provided at its opposite ends with elongated slots, collars loosely mounted on the hubs of said friction members and provided with pins that project into said slots, means for shifting said support to move the friction members into and out of engagement with each other, and a rock shaft provided with an arm that is connected to the bell crank lever for oscillating said lever so as to shift the friction members longitudinally of their shafts and thus vary the speed of the driven shaft; substantially as described.

8. A friction driving mechanism for vehicles, comprising a drive shaft, a driven shaft arranged at right angles thereto, a cone-shaped member slidingly mounted on the drive shaft and provided with a comparatively soft outer surface, a metal disk slidingly mounted on the driven shaft and provided with a beveled edge that coöperates with said cone-shaped member, a shiftable support, an operating member carried by said support and connected to the disk and to said cone-shaped member so that they will be moved into and out of engagement with each other when the support is shifted, yielding means for moving said support in the direction to disengage said members, and means for actuating said operating member so as to change the speed of the driven shaft; substantially as described.

9. A friction driving mechanism for vehicles, provided with a drive shaft, a friction member having a hub that is slidingly mounted on said shaft, an operating member, a yoke connected to said member, a ball bearing raceway interposed between said yoke and the end of said hub; substantially as described.

10. A friction drive mechanism for vehicles, comprising a drive shaft, a longitudinally movable cone-shaped friction member thereon, a driven shaft arranged at right angles to the drive shaft, a longitudinally movable disk thereon having a beveled edge that coöperates with the friction member on the drive shaft, a shiftable support, a bell crank lever pivotally connected to said support and provided at its opposite ends with jaws that embrace the hubs of said disk and cone-shaped member, connections between said hubs and jaws, manually-operated means for shifting said support to move said disk and friction member into and out of engagement with each other, a manually-operated rock shaft having an arm that is connected to the bell crank lever for oscillating it so as to shift the disk and friction member longitudinally of their shafts, a reversing disk slidingly mounted on the driven shaft and provided with a beveled edge, and independent means for moving said reversing disk into and out of engagement with the friction member on the drive shaft; substantially as described.

In testimony whereof I hereunto affix my signature in the presence of two witnesses, this twenty first day of November, 1908.

ALBERT B. COLE.

Witnesses:
WELLS L. CHURCH,
GEORGE BAKEWELL.